(12) United States Patent
Blake et al.

(10) Patent No.: US 8,249,349 B2
(45) Date of Patent: Aug. 21, 2012

(54) LABELING IMAGE ELEMENTS

(75) Inventors: Andrew Blake, Cambridge (GB);
Carsten Rother, Cambridge (GB);
Victor Lempitsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 12/323,355

(22) Filed: Nov. 25, 2008

(65) Prior Publication Data

US 2010/0128984 A1    May 27, 2010

(51) Int. Cl.
*G06K 9/34* (2006.01)
(52) U.S. Cl. ........ 382/180; 382/173; 382/103; 382/159; 382/199; 235/435
(58) Field of Classification Search .............. 382/103, 382/173, 159, 164, 180, 181, 182, 190, 199, 382/232; 235/435; 250/271, 555, 556; 365/106, 365/120
See application file for complete search history.

(56) References Cited

U.S. PATENT DOCUMENTS

| | | | |
|---|---|---|---|
| 5,016,173 A * | 5/1991 | Kenet et al. | 382/128 |
| 6,973,212 B2 | 12/2005 | Boykov et al. | |
| 7,095,890 B2 | 8/2006 | Paragios et al. | |
| 7,424,153 B2 | 9/2008 | Paragios et al. | |
| 2006/0285747 A1 * | 12/2006 | Blake et al. | 382/180 |
| 2007/0003154 A1 | 1/2007 | Sun et al. | |
| 2007/0098285 A1 * | 5/2007 | Yahata et al. | 382/239 |
| 2007/0165949 A1 | 7/2007 | Sinop et al. | |
| 2008/0025609 A1 * | 1/2008 | Yashiro et al. | 382/181 |
| 2008/0037871 A1 | 2/2008 | Sinop et al. | |

OTHER PUBLICATIONS

Boykov, et al., "Computing Geodesics and Minimal Surfaces via Graph Cuts", retrieved on Sep. 6, 2008 at /www.adastral.ucl.ac. uk/~vladkolm/papers/BK-ICCV03.pdf>>, IEEE Computer Society International Conference on Computer~Vision (ICCV), vol. 1, 2003, pp. 26-33.*
Agarwal, et al., "Practical Global Optimization for Multiview Geometry", retrieved on Sep. 26, 2008 at <<http://www.cs.washington. edu/homes/sagarwal/optimal.pdf>>, ECCV, 2006. pp. 1-14.
Boros, et al., "Pseudo-Boolean Optimization", retrieved on Sep. 26, 2008 at <<http://citeseerx.ist.psu.edu/viewdoc/summary?doi=10.1. 1.19.3298>>, Elsevier Science Publishers, Discrete Applied Mathematics, vol. 123, No. 1-3, 2002, pp. 155-225.

(Continued)

*Primary Examiner* — Ali Bayat
(74) *Attorney, Agent, or Firm* — Lee & Hayes, PLLC

(57) ABSTRACT

An image processing system is described which automatically labels image elements of a digital image. In an embodiment an energy function describing the quality of possible labelings of an image is globally optimized to find an output labeled image. In the embodiment, the energy function comprises terms that depend on at least one non-local parameter. For example, the non-local parameter describes characteristics of image elements having the same label. In an embodiment the global optimization is achieved in a practical, efficient manner by using a tree structure to represent candidate values of the non-local parameter and by using a branch and bound process. In some embodiments, the branch and bound process comprises evaluating a lower bound of the energy function by using a min-cut process. For example, the min-cut process enables the lower bound to be evaluated efficiently using a graphical data structure to represent the lower bound.

20 Claims, 6 Drawing Sheets

OTHER PUBLICATIONS

Boykov, et al., "An Experimental Comparison of Min-Cut/Max-Flow Algorithms for Energy Minimization in Vision", retrieved on Sep. 6, 2008 at <<http://www.csd.uwo.ca/~yuri/Papers/pami04.pdf>>, IEEE Pattern Analysis and Machine Intelligence (PAMI), vol. 26, No. 9, 2004, pp. 1124-1137.

Boykov, et al., "Computing Geodesics and Minimal Surfaces via Graph Cuts", retrieved on Sep. 6, 2008 at <<http://www.adastral.ucl.ac.uk/~vladkolm/papers/BK-ICCV03.pdf>>, IEEE Computer Society International Conference on Computer Vision (ICCV), vol. 1, 2003, pp. 26-33.

Boykov, et al., "Graph Cuts and Efficient N-D Image Segmentation", retrieved on Sep. 26, 2008 at <<http://www.springerlink.com/content/j3k24j8347k42425/fulltext.pdf>>, Springer, International Journal of Computer Vision, vol. 70, No. 2, 2006, pp. 109-131.

Boykov, et al., "Interactive Graph Cuts for Optimal Boundary and Region Segmentation of Objects in N-D Images", retrieved on Sep. 26, 2008 at <<http://www.csd.uwo.ca/~yuri/Papers/iccv01.pdf>>, IEEE Computer Society International Conference on Computer Vision (ICCV), vol. 1, 2001, pp. 105-113.

Bray, et al., "PoseCut: Simultaneous Segmentation and 3D Pose Estimation of Humans Using Dynamic Graph-Cuts", retrieved on Sep. 6, 2008 at <<http://research.microsoft.com/en-us/um/people/pkohli/papers/eccv06b.pdf>>, ECCV, 2006, pp. 1-14.

Chan, et al., "Active Contours Without Edges", retrieved on Sep. 6, 2008 at <<http://ieeexplore.ieee.org/stamp/stamp.jsp?arnumber=00902291>>, IEEE Transactions on Image Processing, vol. 10, No. 2, 2001, pp. 266-277.

Clausen, "Branch and Bound Algorithms—Principles and Examples.", retrieved on Sep. 6, 2008 at <<http://www.diku.dk/undervisning/2003e/datV-optimer/JensClausenNoter.pdf>>, Dept of Computer Science, University of Copenhagen, 1999, pp. 1-30.

Cremers, et al., "Kernel Density Estimation and Intrinsic Alignment for Shape Priors in Level Set Segmentation", retrieved on Sep. 6, 2008 at <<http://citeseerx.ist.psu.edu/viewdoc/summary?doi=10.1.1.58.5963>>, Springer, International Journal of Computer Vision, vol. 69, No. 3, 2006, pp. 335-351.

Cremers, et al., "Shape Priors in Variational Image Segmentation: Convexity, Lipschitz Continuity and Globally Optimal Solutions", retrieved on Oct. 7, 2008 at <<http://ieeexplore.ieee.org/stamp/stamp.jsp?arnumber=4587446&isnumber=4587335>>, IEEE Computer Society Conference on Computer Vision and Pattern Recognition (CVPR), 2008, pp. 1-6.

Felzenszwalb, "Representation and Detection of Deformable Shapes", retrieved on Sep. 6, 2008 at <<http://ieeexplore.ieee.org/stamp/stamp.jsp?arnumber=1374867&isnumber=30027>>, IEEE Pattern Analysis and Machine Intelligence (PAMI), vol. 27, No. 2, 2005, pp. 208-220.

Freedman, "Effective Tracking through Tree-Search", retrieved on Sep. 26, 2008 at <<http://citeseerx.ist.psu.edu/viewdoc/summary?doi=10.1.1.3.190>>, IEEE Pattern Analysis and Machine Intelligence (PAMI), vol. 25, No. 5, 2003, pp. 604-615.

Freedman, et al., "Interactive Graph Cut Based Segmentation With Shape Priors", retrieved on Oct. 20, 2008 at <<http://www.cs.rpi.edu/~freedd/publications/freedman_05_cvpr-segment.pdf>>, IEEE Computer Society International Conference on Computer Vision (ICCV), vol. 2005, pp. 755-762.

Gavrila, et al., "Real-Time Object Detection for "Smart" Vehicles", retrieved on Oct. 7, 2008 at <<http://ieeexplore.ieee.org/stamp/stamp.jsp?arnumber=791202&isnumber=17134>>, IEEE Computer Society International Conference on Computer Vision (ICCV), vol. 1, 1999, pp. 87-93.

Greig, et al., "Exact Maximum A Posteriori Estimation for Binary Images", retrieved on Sep. 6, 2008 at <<http://links.jstor.org/sici?sici=0035-9246%281989%2951%3A2%3C271%3AEMAPEF%3E2.0.CO%3B2-5>>, Journal of the Royal Statistical Society, Series B (Methodological), vol. 51, No. 2, 1989, pp. 271-279.

Huang, et al., "A Graphical Model Framework for Coupling MRFs and Deformable Models", retrieved on Sep. 26, 2008 at <<http://paul.rutgers.edu/~ruihuang/papers/rhuang_cvpr04.pdf>>, IEEE Computer Society Conference on Computer Vision and Pattern Recognition (CVPR), 2004, pp. 1-8.

Kim, et al., "A Segmentation Algorithm for Contrast-Enhanced Images", retrieved on Sep. 26, 2008 at <<http://ieeexplore.ieee.org/stamp/stamp.jsp?arnumber=1238389&isnumber=27772>>, IEEE Computer Society International Conference on Computer Vision (ICCV), vol. 1, 2003, pp. 502-509.

Kohli, et al., "Efficiently Solving Dynamic Markov Random Fields using Graph Cuts", retrieved on Sep. 26, 2008 at <<http://ieeexplore.ieee.org/stamp/stamp.jsp?arnumber=1544820&isnumber=32976>>, IEEE Computer Society International Conference on Computer Vision (ICCV), vol. 2, 2005, pp. 922-929.

Kolmogorov, et al., "Applications of parametric maxflow in computer vision", retrieved on Oct. 7, 2008 at <<http://ieeexplore.ieee.org/stamp/stamp.jsp?arnumber=4408910&isnumber=4408819>>, IEEE Computer Society International Conference on Computer Vision (ICCV), 2007, pp. 1-8.

Kolmogorov, et al., "What Energy Functions Can Be Minimized via Graph Cuts?", retrieved on Sep. 26, 2008 at <<www.cs.cornell.edu/rdz/Papers/KZ-ECCV02-graphcuts.pdf>>, ECCV, 2002, pp. 147-159.

Kumar, et al., "OBJ Cut", retrieved on Sep. 26, 2008 at <<http://ieeexplore.ieee.org/stamp/stamp.jsp?arnumber=1467244&isnumber=31472>>, IEEE Computer Society Conference on Computer Vision and Pattern Recognition (CVPR), 2005, pp. 1-8.

Lampert, et al., "Beyond SlidingWindows: Object Localization by Efficient Subwindow Search", retrieved on Sep. 26, 2008 at <<http://www.kyb.mpg.de/publications/pdfs/pdf5070.pdf>>, IEEE Computer Society Conference on Computer Vision and Pattern Recognition (CVPR), 2008, pp. 1-8.

Leibe, et al., "Robust Object Detection with Interleaved Categorization and Segmentation", retrieved on Sep. 26, 2008 at <<http://www.vision.ee.ethz.ch/~bleibe/papers/leibe-interleaved-ijcv07final.pdf>>, International Journal of Computer Vision (IJCV) Special Issue on Learning for Vision and Vision for Learning, vol. 77, No. 1-3, 2008, pp. 259-289.

Lempitsky, et al., "Image Segmentation by Branch-and-Mincut", retrieved on Sep. 26, 2008 at <<http://research.microsoft.com/~victlem/eccv2008.pdf>>, Microsoft Technical Report MSR-TR-2008-100, 2008, pp. 1-14.

Leventon, et al., "Statistical Shape Influence in Geodesic Active Contours", retrieved on Sep. 26, 2008 at <<http://citeseerx.ist.psu.edu/viewdoc/summary?doi=10.1.1.37.3900>>, IEEE Computer Society Conference on Computer Vision and Pattern Recognition (CVPR), 2000, pp. 1-8.

Malcolm, et al., "Graph Cut Segmentation with Nonlinear Shape Priors", retrieved on Sep. 26, 2008 at <<http://www.bme.gatech.edu/groups/minerva/publications/papers/jimi-icip07-graphcut-nonlinear-shape-priors.pdf>>, IEEE International Conference on Image Processing (ICIP), vol. 4, 2007, pp. 365-368.

Memin, et al., "Dense Estimation and Object-Oriented Segmentation of the Optical Flow with Robust Techniques", retrieved on Sep. 6, 2008 at <<http://hal.inria.fr/docs/00/07/38/54/PDF/RR-2836.pdf>>, INRIA (Institut National de Recherche en Informatique et en Automatique), Report No. 2836, 1996, pp. 1-44.

Osher, et al., "Fronts Propagating with Curvature Dependent Speed: Algorithms Based on Hamilton-Jacobi Formulations", retrieved on Sep. 26, 2008 at <<http://citeseerx.ist.psu.edu/viewdoc/summary?doi=10.1.1.46.1266>>, Journal of Computational Physics, vol. 79, No. 8, 1988, pp. 12-49.

Rother, et al., "GrabCut—Interactive Foreground Extraction using Iterated Graph Cuts", retrieved on Sep. 26, 2008 at <<http://research.microsoft.com/vision/Cambridge/papers/siggraph04.pdf>>, ACM Transactions on Graphics (SIGGRAPH Conference), vol. 23, No. 3, 2004, pp. 309-314.

Schoenemann, et al., "Globally Optimal Image Segmentation with an Elastic Shape Prior", retrieved on Sep. 26, 2008 at <<http://www.ieeexplore.ieee.org/stamp/stamp.jsp?arnumber=4408972&isnumber=4408819>>, IEEE Computer Society International Conference on Computer Vision (ICCV), 2007, pp. 1-6.

Sinop, et al., "Uninitialized, Globally Optimal, Graph-Based Rectilinear Shape Segmentation—The Opposing Metrics Method", retrieved on Sep. 26, 2008 at <<http://www.cns.bu.edu/~lgrady/sinop2007globally.pdf>>, IEEE Computer Society International Conference on Computer Vision (ICCV), 2007, pp. 1-8.

Wang, et al., "Boundary Finding with Correspondence Using Statistical Shape Models", retrieved on Sep. 26, 2008 at <<http://noodle.med.yale.edu/papers/cvpr98wang.pdf>>, IEEE Computer Society Conference on Computer Vision and Pattern Recognition (CVPR), 1998, pp. 338-345.

* cited by examiner

LABELING IMAGE ELEMENTS

BACKGROUND

Automatically labeling image elements of a digital image is carried out in many applications. For example, to segment an image into a foreground region and a background region each image element is labeled as being part of either the foreground or background. Once this segmentation is achieved, the regions may be used in a variety of applications. For example, the foreground region may be used in an object recognition process to identify the object(s) in the image which may be of a visual scene. For example, the foreground region may depict a person standing in front of a landscape or sitting in an office environment (such as during a video conference). The background region may be replaced, for example, in an image editing application. Many other such examples exist where segmented images are used including in the fields of image editing, medical image processing and satellite image processing.

Other applications in which image elements of a digital image are automatically labeled include three-dimensional imagesegmentation. Here, 3D image elements (voxels) are labeled as being part of (or not being part of) an object. Other applications include image stitching whereby images are automatically joined together at a seam and image elements are labeled as being on a particular side of the seam so as to choose a seam which is least visible. Many other such applications exist in which image elements are labeled as having one of two possible labels (a binary labeling) or one of more than two possible labels. An example in which image elements are labeled as having one of tens or hundreds of possible labels is object classification whereby image elements are labeled as being from an object of a particular class (such as sky, building, person, animal, water).

The digital image may be a 2D image or a 3D image. For example, the 3D image may be obtained using a depth camera or z-camera. In the case of a 2D image the image elements may be pixels or groups of pixels. In the case of a 3D image the image elements may be voxels or groups of voxels.

The task of automatically labeling image elements of a digital image is complex and time consuming and yet many applications which use the results of the image labeling process require high quality results in real time. For example, video conferencing applications and image editing applications.

Previous automated image labeling systems have specified an energy function describing the quality of potential labelings of an image. An energy minimization process is then applied to find an optimal image labeling. However, this energy minimization process is typically time consuming and complex and often may become stuck in local optima, which in many cases correspond to poor solutions.

The embodiments described below are not limited to implementations which solve any or all of the disadvantages of known image labeling systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An image processing system is described which automatically labels image elements of a digital image. For example, image elements are labeled as being either part of a foreground image region or part of a background image region. In other examples the labels indicate whether an image element is part of a three dimensional object or not, or may indicate whether an image element is on a particular side of a seam joining two images. In an embodiment an energy function describing the quality of possible labelings of an image is globally optimized to find an output labeled image. In the embodiment, the energy function comprises terms that depend on at least one non-local parameter. For example, the non-local parameter describes characteristics of image elements having the same label (such as foreground image elements for example). In an embodiment the global optimization is achieved in a practical, efficient manner by using a tree structure to represent candidate values of the non-local parameter and by using a branch and bound process. In embodiments, the branch and bound process comprises evaluating a lower bound of the energy function by using a min-cut process. For example, the min-cut process enables the lower bound to be evaluated in a straightforward manner using a graphical data structure to represent the lower bound. In some embodiments the non-local parameter comprises an object template made up of tens of millions of exemplar image segmentations, each image depicting different 3D poses of an object. In other embodiments the non-local parameter comprises a set of color distributions or average image element intensity values.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image labeling system for binary labeling of a two-dimensional image (whereby each image element may have one of two possible labels), the system described is provided as an example and not a limitation. As those skilled in the art will appreciate, the present examples are suitable for application in a variety of different types of image labeling systems including those where more than two labels are used and including those where the image elements are three-dimensional.

Figure 1:
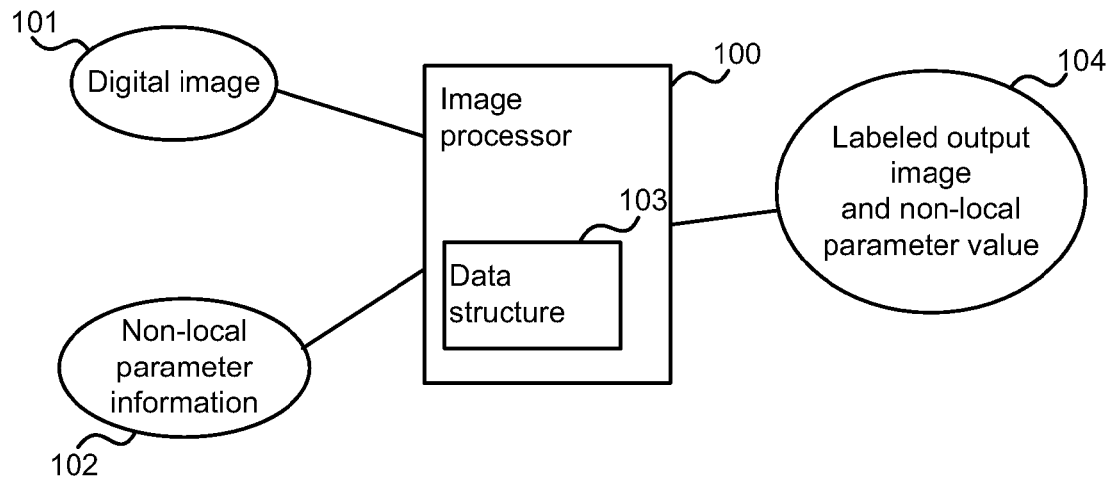
FIG. 1 is a schematic diagram of an automated image labeling system.

FIG. 1 is a schematic diagram of an automated image labeling system 100. Inputs to the system comprise a digital image 101 to be labeled and non-local parameter information 102. The digital image may be a 2D or a 3D image. The non-local parameter information is described in more detail below.

The automated image labeling system is an image processor provided using any suitable computer. It comprises a memory storing one or more data structures used to represent information about an energy function and also to represent the non-local parameter information. The output produced by the image processor comprises a labeled version of the input image 104 and an associated value of the non-local parameter.

The non-local parameter is about the labeling. For example, in the case of a binary labeling to identify a foreground and a background image region, the non-local parameter may describe a characteristic of the foreground as a whole. It is also possible for the non-local parameter to describe characteristics of the background as a whole, and/or characteristics of the foreground and background as a whole. The information is said to be "non-local" because it describes one or more characteristics of all image elements having the same label. Such information may be handled by a non-local parameter using the approach described herein. It is recognized herein that using non-local information is likely to give higher quality image labeling results than using local information when such non-local information is available.

The image processor comprises a memory storing data structures 103 representing information about an energy function as mentioned above. The energy function describes the quality of potential labelings of the digital image and comprises a plurality of terms. At least some of the terms (and in some embodiments, all of the terms) depend on at least one non-local parameter. The non-local parameter describes characteristics of all image elements having the same label. The image processor is arranged to globally optimize the energy function in order to obtain the labeled output image 104 and associated optimal value of the non-local parameter. This is achieved as described below giving high quality image labeling results in a practical, time-efficient manner.

Figure 2:
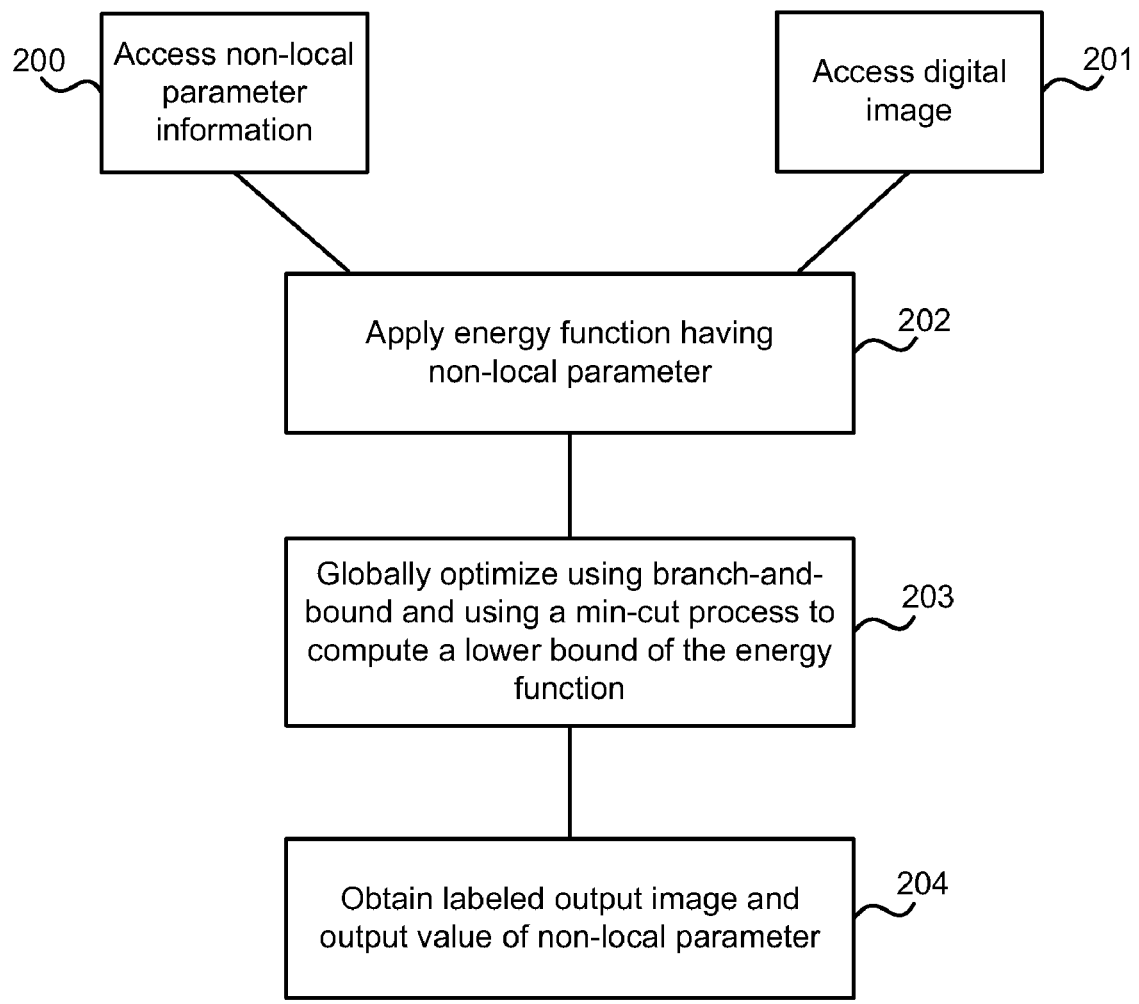
FIG. 2 is a block diagram of a method of automatically labeling an image.

FIG. 2 is a block diagram of an example method of automatically labeling a digital image. Non-local parameter information is accessed 200 and a digital image is accessed 201. The non-local parameter information and the digital image are applied 202 to an energy function. The energy function has terms that depend on the non-local parameter and is represented in memory at the image processor. The energy function is globally optimized using a branch-and-bound process and using a min-cut process to compute a lower bound of the energy function 203. The result of the optimization provides a labeled version of the digital image and an associated value of the non-local parameter 203. These outputs may be stored and/or provided as input to another automated system, such as an image editor, an image stitching apparatus, a medical image processing system, an object recognition system or other automated system.

The term "branch and bound process" is used to refer to any method of branch-and-bound search such as depth first branch-and-bound or best first branch-and-bound. A branch and bound search may be used to find optimal solutions of various optimization problems. It comprises making a systematic enumeration of candidate solutions, where large subsets of candidates are discarded during the search by using upper and/or lower estimated bounds of a quantity being optimized.

A branch and bound process typically involves using a tree structure where nodes of the tree represent subsets of candidate solutions. The tree structure is formed using a splitting procedure in any of a variety of possible ways. Upper and/or lower bounds for the candidate solutions within a given subset are estimated in a bounding process. Branches of the tree structure may be pruned or discarded based on a comparison of the estimated lower and/or upper bounds. By pruning branches of the tree it is not necessary to evaluate all the candidate solutions in order to find an optimal solution.

For example, suppose that it is desired to find a minimum value of a function $f(x)$ where x ranges over a set S of candidate solutions. A tree structure is formed. For example, the tree structure is formed using a splitting procedure that given the set S of candidate solutions, returns two or more smaller sets S1, S2, whose union covers S (that is the smaller sets may or may not overlap). The splitting procedure is recursively applied in order to form a tree structure. For example, the single node at the root of the tree represents the set of all candidate solutions and the leaves of the tree represent individual candidate solutions. The nodes intermediate in the tree represent subsets of candidate solutions.

The branch and bound process begins at the root node of the tree and works its way towards the leaves of the tree. Upper and/or lower bounds are estimated at nodes considered by the process and branches of the tree may be pruned as mentioned above, on the basis of comparisons of the estimated upper and/or lower bounds. For example, if the lower bound for a tree node (set of candidates) A is greater than the upper bound from another node B, then A may be pruned from the tree. For example, a global variable may be maintained that records the minimum upper bound see among all nodes examined so far. Any node whose lower bound is greater than the global variable may then be discarded.

The order in which the branch and bound process examines the nodes of the tree may vary. For example, in best-first branch and bound, the process selects, from those nodes already examined, the one having the best lower or upper bound (according to a specified criterion), and proceeds to examine a node branching from that selected node. In depth first branch and bound the process proceeds as far as possible along a branch before backtracking to the last choice point. Branch and bound algorithms are described in detail in "Branch and Bound Algorithms—Principles and Examples." Parallel Computing in Optimization 1997 J. Clausen which is incorporated herein by reference in its entirety.

A branch and bound process may end when all nodes of the tree have been either pruned or evaluated. However, this is not essential. The process may be terminated according to other criteria.

The term "min-cut" process is used to refer to any algorithm for finding minimal cuts in a network graph. The network graph is a finite directed graph comprising nodes connected by edges. The graph has two vertices typically referred to as source node s and sink node t. Each edge has a capacity which is a non-negative real number. A "cut" in such a network graph is a split of the nodes into two disjoint sets S and T, such that the source node is in S and the sink node is in T. A min-cut process is then one which finds one or more cuts in the network graph where the sum of the capacity of all the edges crossing the cut, from the region S to the region T is minimal. The capacity of a minimal cut is said to equal the maximum amount of flow in the network as a result of Menger's theorem.

Figure 3:
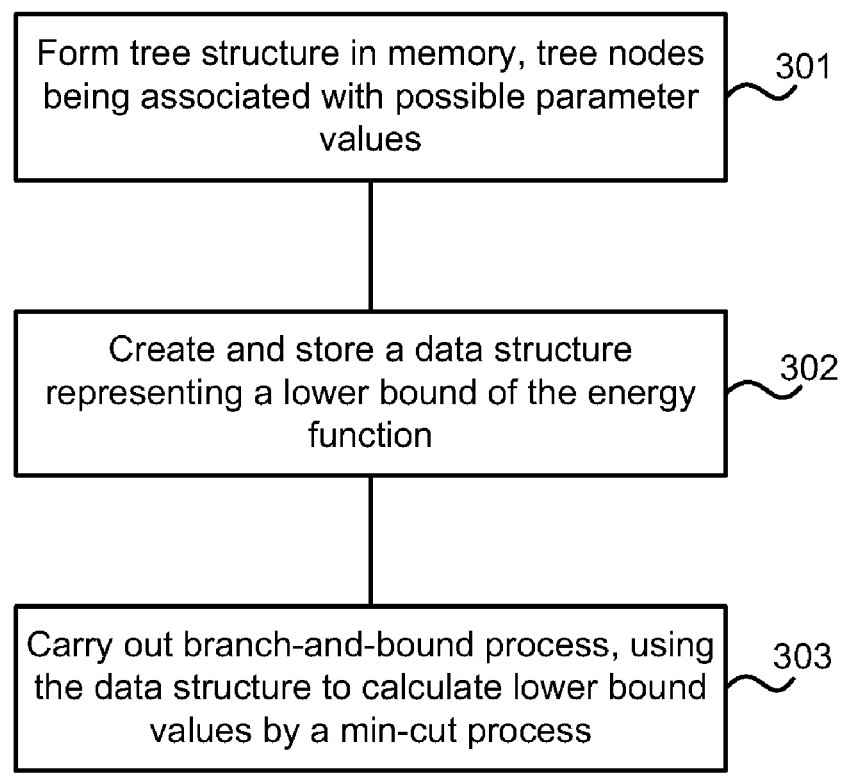
FIG. 3 is a block diagram showing more detail of part of the method of FIG. 2.

FIG. 3 is a block diagram showing more detail of the method at block 203 of FIG. 2. The image processor (100 of FIG. 1) is arranged to create and store 301 a data structure (103 of FIG. 1) comprising a tree structure storing information about candidate solutions of the global optimization. For example, each node of the tree stores possible subsets of values of the non-local parameter. A graphical data structure is also created and stored 302 representing a lower bound of the energy function. For example, this data structure is a network graph as described in more detail below. A branch and bound process is then carried out 303 in the tree structure and using the graphical data structure to calculate lower bound values by a min-cut process. In this way at least one optimal value of the non-local parameter is found together with an associated labeling of the image.

By using the graphical data structure to represent the lower bound it is possible to evaluate the lower bound efficiently and in a practical time scale. As a result it is possible to globally optimize the energy function even though the energy function has terms which are dependent on a non-local parameter. In this way high quality labeled output images are produced in a timely manner.

Figure 4:
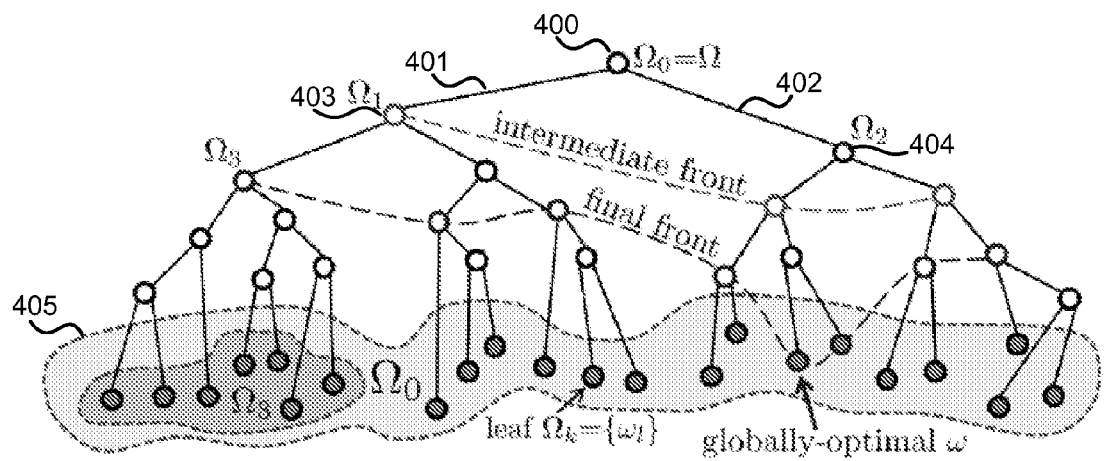
FIG. 4 is a schematic diagram of a tree structure used in an example of the method of FIG. 3.

An example of a tree structure is shown in FIG. 4. This example tree structure comprises a root node 400 corresponding to all possible values of the non-local parameter in a specified range and this is represented by the symbol Q. Individual values of the non-local parameter are represented by the symbol w. Two branches 401, 402 stem from the root node to intermediate nodes 403, 404. Those intermediate nodes each represent a sub set of the possible values of the non-local parameter the sub sets being referred to as Q1 and Q2. Further branches stem from each of those intermediate nodes 403, 404 and so on until leaf nodes are reached, each leaf node representing an individual value of the non-local parameter. In this example, all the leaf nodes are shown inside a dotted line 405. In practice, the tree structure may comprise many more nodes; only a relatively small number of nodes are illustrated in FIG. 4 for clarity. In the example of FIG. 4 the tree is almost a binary tree as almost all the intermediate nodes have two branches. However, it is not essential to use a binary tree structure; any suitable tree structure may be used. The tree structure is formed in any suitable manner depending on the particular application and some examples are given below.

As described above with reference to FIG. 2 an energy function is applied 202 which comprises a non-local parameter. More detail about the energy function is now given.

The set of image elements in the image is denoted as v and letters p and q are used to denote individual image elements. A set of edges connecting adjacent image elements is described as ϵ and individual edges are referred to as to the pairs of image elements (e.g. p, q). For example, the set of edges may comprise all 8-connected pixel pairs in a raster where the image elements are pixels.

A binary labeling of the image is given by its 0-1 labeling $x \in 2^v$, where individual pixel labels $x_p$ take the values 1 for the pixels classified as the fore-ground and 0 for the pixels classified as the background. In the case that the labeling is for an image segmentation application. The non-local parameter is denoted as ω and allowed to vary over a discrete, possibly very large, set Ω. The general form of the energy function is then given by:

$$E(x, \omega) = C(\omega) + \sum_{p \in v} F^p(\omega) \cdot x_p + \sum_{p \in v} B^p(\omega) \cdot (1 - x_p) + \sum_{p,q \in \xi} P^{pq}(\omega) \cdot |x_p - x_q|. \quad (1)$$

Here, $C(\omega)$ is a constant potential, which does not depend directly on the segmentation x; $F^p(\omega)$ and $B^p(\omega)$ are unary potentials defining the cost for assigning the image element p to label 0 or label 1 (for example to the foreground and to the background respectively); $P^{pq}(\omega)$ is the pairwise potential defining a cost of assigning adjacent image elements p and q to different labels. The pairwise potentials may be taken non-negative to ensure the tractability of $E(x,\omega)$ as the function of x.

The potentials in the above energy function depend on the non-local parameter $\omega \in \Omega$. In general, Ω is a discrete set, which may be large (e.g. millions of elements) and has some structure (although, it need not be linearly or partially ordered). In some embodiments, Ω corresponds to a product space of various poses and deformations of an object template. In another embodiment Ω corresponds to a set of parametric color distributions.

As described with reference to FIG. 2, the energy function of equation 1 is optimized globally 203, finding its global minimum using branch-and-bound tree search, which utilizes a lower bound on the energy function derived as follows:

$$\min_{x \in 2^v, \omega \in \Omega} E(x, \omega) = \min_{x \in 2^v} \min_{\omega \in \Omega} \left[ C(\omega) + \sum_{p \in v} F^p(\omega) \cdot x_p + \sum_{p \in v} B^p(\omega) \cdot \quad (2)$$

$$(1 - x_p) + \sum_{p,q \in \varepsilon} p^{pq}(\omega) \cdot |x_p - x_q| \right] \geq$$

$$\min_{x \in 2^v} \left[ \min_{\omega \in \Omega} C(\omega) + \sum_{p \in v} \min_{\omega \in \Omega} F^p(\omega) x_p + \right.$$

$$\sum_{p \in v} \min_{\omega \in \Omega} B^p(\omega) \cdot (1 - x_p) +$$

$$\left. \sum_{p,q \in \varepsilon} \min_{\omega \in \Omega} P^{pq}(\omega) \cdot |x_p - x_q| \right]$$

$$= \min_{x \in 2^v} \left[ C_\Omega + \sum_{p \in v} F_\Omega^p \cdot x_p + \sum_{p \in v} B_\Omega^p \cdot \right.$$

$$\left. (1 - x_p) + \sum_{p,q \in \varepsilon} P_\Omega^{pq} \cdot |x_p - x_q| \right]$$

$$= L(\Omega).$$

Here $C_\Omega$, $F_\Omega^p$, $B_\Omega^p$, $P_\Omega^{pq}$ denote the minima of $C(\omega)$, $F^p(\omega)$, $B^p(\omega)$, $P^{pq}(\omega)$ over $\omega \in \Omega$ referred below as aggregated potentials. $L(\Omega)$ denotes the derived lower bound for $E(x,\omega)$ over $2^v \otimes \Omega$. The inequality in equation 2 is essentially the Jensen inequality for the minimum operation.

Some features of this lower bound include:

Monotonicity. For the nested domains of non-local parameters $\Omega_1 \subset \Omega_2$ the inequality $L(\Omega_1) \geq L(\Omega_2)$ holds.

Figure 5:
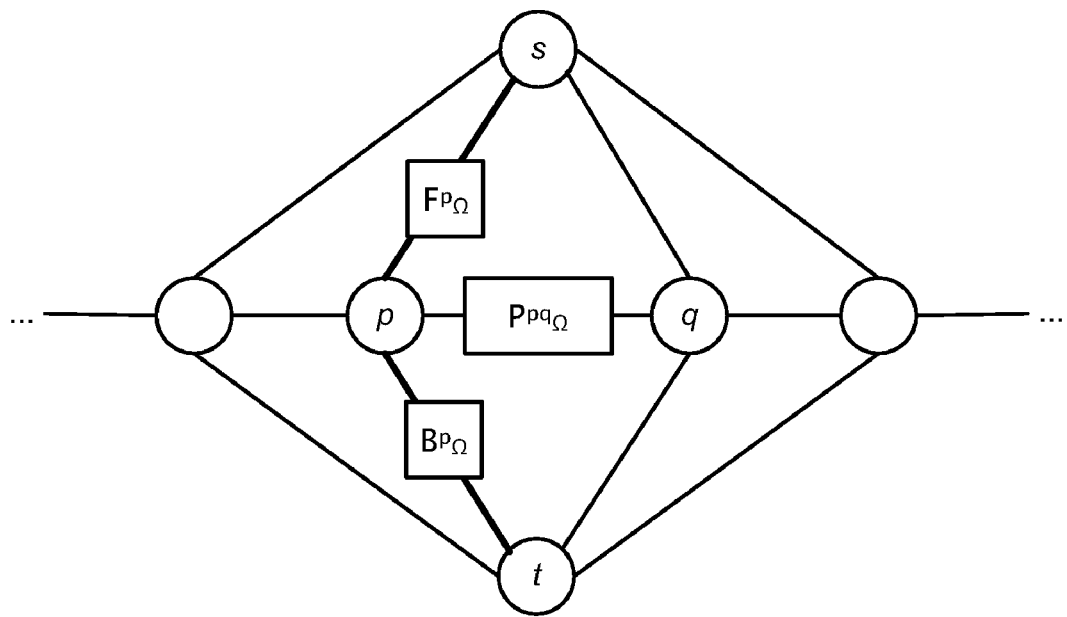
FIG. 5 is an example of part of a graphical data structure.

Computability. The lower bound may be evaluated in a straightforward way using a min-cut process 203. Indeed, the lower bound equals the minimum of a submodular quadratic pseudo-boolean function. As described with reference to FIG. 3 a graphical data structure is created and stored representing a lower bound of the energy function. The graphical data structure may be a network graph formed as illustrated in FIG. 5 which shows an example fragment of a network realizing $L(\Omega)$. The network graph comprises many more such fragments connected together although only one is shown here for clarity. The network graph is formed such that each configuration of the binary variables is in one-to-one correspondence with an st-cut of the graph having the weight equal to the value of the function (plus a constant $C_\Omega$). A minimal st-cut corresponding to the minimum of $L(\Omega)$ may then be computed in a low-polynomial of |v| time with any suitable min-cut process 303. An example of a min-cut process is given in Y. Boykov, V. Kolmogorov: "An Experimental Comparison of Min-cut/Max-Flow Algorithms for Energy Minimization in Vision", in PAMI, 26(9), 2004, which is incorporated herein by reference in its entirety.

Tightness. For a singleton $\Omega$ the bound is tight: $L(\{\omega\})=\min_{x \in 2^\nu} UE(x,\omega)$. As a result, the minimal st-cut also yields the segmentation x optimal for this $\omega$ ($x_p=0$ iff the respective vertex belongs to the s-component of the cut).

Note, that the fact that the lower bound of equation 2 may be evaluated via st-mincut gives rise to a whole family of looser, but cheaper, lower bounds. For example, the minimal cut on a network graph may be found by pushing flows until the flow becomes maximal (and equal to the weight of the mincut). Thus, the sequence of intermediate flows provides a sequence of the increasing lower bounds on equation 1 converging to the bound of equation 2. If some upper bound on the minimum value is imposed, the process may be terminated earlier without computing the full maxflow/mincut. This happens when the new flow bound exceeds the given upper bound. In this case it may be concluded that the value of the global minimum is greater than the imposed upper bound.

As described with reference to FIGS. 3 and 4 a tree structure is formed 301. For example, the tree may be a binary tree (although this is not essential). In an embodiment, a binary tree of subregions $T_\Omega = \{\Omega = \Omega_0, \Omega_1, \ldots \Omega_N\}$ of the discrete domain of the non-local parameter values $\Omega$ is constructed. Each non-leaf node corresponding to the subregion $\Omega_k$ then has two children corresponding to the subregions $\Omega_{ch1(k)}$ and $\Omega_{ch2(k)}$ such that $\Omega_{ch1(k)} \subset \Omega_k, \Omega_{ch2(k)} \subset \Omega_k$. Here, ch1(•) and ch2(•) map the index of the node to the indices of its children. Also, leaf nodes of the tree are in one-to-one correspondence with singleton subsets $\Omega_1=\{\omega_t\}$.

Given such a tree, the global minimum of equation 1 can be efficiently found using a best-first branch-and-bound search. This algorithm propagates a front of nodes from the root of the tree towards the leaves. During the search, the front contains a set of tree nodes, such that each top-down path from the root to a leaf contains exactly one active vertex. In the beginning, the front contains the tree root $\Omega_0$. At each step the active node with the smallest lower bound (as estimated using a min cut process) is removed from the active front, while two of its children are added to the active front (by monotonicity property they have higher or equal lower bounds). Thus, an active front moves towards the leaves making local steps that increase the lowest lower bound of all active nodes. Note, that at each moment, this lowest lower bound of the front constitutes a lower bound on the global optimum of equation 1 over the whole domain.

At some moment of time, the active node with the smallest lower bound turns out to be a leaf $\{\omega'\}$. Let x' be the optimal segmentation for $\omega'$ (found via minimum st-cut). Then, $E(x', \omega')=L(\omega')$ (tightness property) is by assumption the lowest bound of the front and hence a lower bound on the global optimum over the whole domain. Consequently, (x',$\omega'$) is a global minimum of equation 1 and the search terminates without traversing the whole tree. In practice it has been found that the number of the traversed nodes is typically very small (two-three orders of magnitude smaller then the size of the full tree). Therefore, the image processor 100 performs global optimization much faster than exhaustive search over $\Omega$.

In order to further accelerate the search, the coherency between the mincut problems solved at different nodes may be exploited in some embodiments. The maximum flow as well as auxiliary structures such as shortest path trees computed for one graph may be "reused" in order to accelerate the computation of the minimal st-cut on another similar graph. For some applications, this reuse may give an order of magnitude speed-up for the evaluation of lower bounds.

In another embodiment a depth-first branch and bound process is used. When problem-specific heuristics are available that give good initial solutions, this variant may lead to moderate (up to a factor of 2) time savings. Also, the depth-first variant of the search, which maintains upper bounds on the global optimum, may benefit significantly from the use of flow bounds.

In some embodiments the non-local parameter is used to enable the labeling process to take into account shape information. For example, this shape information may comprise tens of millions of exemplar segmentations of images depicting the same object but in different poses. These exemplar segmentations may be referred to as an object template. For example, where the labeling is used to segment an image into foreground and background regions, a prior is defined by a set of exemplar binary segmentations $\{y^\omega | \omega \in \Omega\}$, where $\Omega$ is a discrete set indexing the exemplar segmentations.

Then the following term introduces a joint prior over the segmentation and the non-local parameter into the segmentation process:

$$E_{prior}(x, \omega) = \rho(x, y^\omega) = \sum_{p \in \upsilon}(1-y_p^\omega) \cdot x_p + \sum_{p \in \upsilon} y_p^\omega \cdot (1-x_p), \quad (3)$$

where p denotes a Hamming distance between segmentations. Any suitable measure of similarity between segmentations may be used in place of the Hamming distance. This term clearly has the form of equation 1 and therefore its combinations with other terms of this form can be optimized as described with reference to FIGS. 2 and 3. Being optimized over the domain $2^\nu \otimes \Omega$, this term would encourage the segmentation x to be close in the Hamming distance to some of the exemplar shapes. Note, that the Hamming distance in the continuous limit may be interpreted as the L1-distance between shapes. It is relatively straightforward to modify equation 3 to replace the Hamming distance with discrete approximations of other distances (L2, truncated L1 or L2, data-driven Mahalonobis distance, etc.).

The full segmentation energy then may be defined by adding a standard contrast-sensitive edge term as described in Y. Boykov, M.-P. Jolly: "Interactive Graph Cuts for Optimal Boundary and Region Segmentation of Objects in N-D Images", in ICCV 2001, which is incorporated herein by reference in its entirety:

$$E_{shape}(x, \omega) = E_{prior}(x, \omega) + \sum_{p,q \in \varepsilon} \lambda \frac{e^{-\frac{\|K_p - K_q\|}{\sigma}}}{|p-q|} \cdot |x_p - x_q|, \quad (4)$$

Where $\|K_p-K_q\|$ denote the SAD (L1) distance between RGB colors of image elements p and q in the image ($\lambda$ and $\sigma$ may be fixed), |p-q| denotes the distance between the centers of the image elements p and q (being either 1 or $\sqrt{2}$ for an 8-connected grid). The functional of equation 4 thus incorporates the shape prior with edge-contrast cues.

In practice, the set $\Omega_{shape}$ could be huge, e.g. tens of millions exemplars. Therefore, representation and hierarchical clustering of the exemplar segmentations $y^\omega$, $\omega \in \Omega$ needs careful design. In addition, the aggregated potentials for each node of the tree may be precomputed and stored in memory. This is accomplishable in many cases when the translation invariance is exploited. In one embodiment, the set $\Omega_{shape}$ is factorized into the Cartesian product of two sets $\Omega_{shape} = \Delta \otimes \Theta$. The factor set $\Delta$ indexes the set of all exemplar segmentations $y_\delta$ centered at the origin (this set may correspond to the variations in scale, orientation as well as non-rigid deformations). The factor set $\Theta$ then corresponds to the shift transformations and ensures the translation invariance of the prior. Any exemplar segmentation $y_\omega$, $\omega = \delta \otimes \theta$ is then defined as some exemplar segmentation $y_\delta$ centered at the origin and then shifted by the shift $\theta$.

Being much smaller than $\Omega_{shape}$, both factor sets can be clustered in hierarchy trees. For the factor set $\Delta$ agglomerative clustering may be used to form the tree structure. Agglomerative clustering is a complete linkeage algorithm that uses the Hamming distance between the exemplar segmentations. The factor set $\Theta$ uses the natural hierarchical clustering of the quad-tree to form a tree structure. Then the tree over $\Omega_{shape}$ is defined as a "product" of the two factor trees. At runtime both factor trees are maintained in the memory of the computer. Then a node in the product tree is determined by a pair of nodes: one in the shape tree and the other in the translation tree. Descending towards the children of the node in the product tree corresponds to descending to the children in one of the factor trees. The aggregated potentials $F_\Omega$ and $B_\Omega$ in equation 2 for tree nodes may be precomputed in a bottom-up pass and stored in memory. The redundancy arising from translation invariance may be used to keep the required amount of memory reasonable.

Since any shapes can be included in $\Omega_{shape}$, general 3D pose transformations and deformations may be handled. Also, the exemplar segmentations may have general varying topology not restricted to segments with single-connected boundaries. Other terms may also be introduced in the segmentation process (e.g. regional terms used in a standard graph cut segmentation).

Segmentation with Color/Intensity Priors

In some embodiments prior information about the intensity or color distributions of image elements of a particular label is taken into account. The examples now described relate to segmenting images into foreground and background regions. However, the labeling process of those examples is equally applicable to other labeling problems.

In T. Chan, L. Vese: "Active Contours Without Edges", Trans Image Process, 10(2), 2001, which is incorporated herein by reference in its entirety, Chan and Vese have proposed the following functional for the variational image segmentation problem:

$$E(S, c^f, c^b) = \mu \int_{\partial S} dl + \nu \int_S dp + \lambda_1 \int_S (I(p) - c^f)^2 dp + \lambda_2 \int_{\bar{S}} (I(p) - c^b)^2 dp, \quad (6)$$

where S denotes the foreground segment, and I(p) is a grayscale image. The first two terms measure the length of the boundary and the area, the third and the forth terms are the integrals over the fore- and background of the difference between image intensity and the two intensity values $c^f$ and $c^b$, which correspond to the average intensities of the respective regions.

A discretized version of this functional can be optimized globally using the methods described herein. The discrete version of equation 6 may be written as (using notation as before):

$$E(x, (c^f, c^b)) = \sum_{p,q \in \varepsilon} \frac{\mu}{|p,q|} \cdot |x_p - x_q| + \qquad (7)$$

$$\sum_{p \in \upsilon} (\nu + \lambda_1 (I(p) - c^f)^2) \cdot x_p + \sum_{p \in \upsilon} \lambda_2 (I(p) - c^b)^2 \cdot (1 - x_p),$$

Here, the first term approximates the first term of equation 6 (the accuracy of the approximation depends on the size of the pixel neighborhood), and the last two terms express the last three terms of equation 6 in a discrete setting.

The functional of equation 7 clearly has the form of equation 1 with non-local parameter $\omega = \{c^f, c^b\}$. Discretizing intensities $c^f$ and $c^b$ into 255 levels and building a quad-tree over their joint domain, the global optimization method of FIGS. 2 and 3 may be applied to find the global minima of equation 6.

Segmenting Color Images

As described in C. Rother, V. Kolmogorov, A. Blake: "GrabCut": Interactive Foreground Extraction Using Iterated Graph Cuts", ACM Trans Graph 23(3), 2004, (which is incorporated herein by reference in its entirety), a framework for the interactive color image segmentation based on Gaussian mixtures has been proposed. In that framework, the segmentation is driven by the following energy:

$$E_{GrabCut}(x, (GM^f, GM^b)) = \qquad (8)$$

$$\sum_{p \in \upsilon} -\log(P(K_p | GM^f)) \cdot x_p + \sum_{p \in \upsilon} -\log(P(K_p | GM^b)) \cdot (1 - x_p) +$$

$$\sum_{p,q \in \varepsilon} \frac{\lambda_1 + \lambda_2 \cdot e^{-\frac{\|K_p - K_q\|^2}{\beta}}}{|p - q|} \cdot |x_p - x_q|.$$

Here, $GM^f$ and $GM^b$ are Gaussian mixtures in RGB color space and the first two terms of the energy measure how well these mixtures explain colors Kp of image elements attributed to fore- and background respectively. The third term is the contrast sensitive edge term, to enable the segmentation boundary to be compact and tend to stick to color region boundaries in the image. In addition to this energy, a user provides supervision in the form of a bounding rectangle and brush strokes, specifying which parts of the image should be attributed to the foreground and to the background.

The energy of equation 8 has the form of equation 1 and therefore can be optimized using the methods of FIGS. 2 and 3 provided that the space of non-local parameters (which in this case is the joint space of the Gaussian mixtures for the foreground and for the background) is discretized and a tree of the subregions is built. It is possible, to choose a much smaller discrete subset $\Omega$ that is still likely to contain a good approximation to the globally-optimal mixtures.

In an embodiment, to construct such $\Omega$, a mixture of M=8 Gaussians $G_1, G_2, \ldots G_M$ with the support areas $a_1, a_2, \ldots a_M$ is fitted to the whole image. The support area $a_i$ here counts the number of image elements p such as $\forall j P(K_p | G_i) \geq P(K_p | G_j)$. The components are ordered such that the support areas decrease ($a_i > a_{i+1}$). The Gaussian mixtures are defined by the binary vector $\beta = \{\beta_1, \beta_2 \ldots \beta_M\} \in \{0,1\}$ specifying which Gaussians should be included into the mixture: $P(K | GM(\beta)) = \Sigma_i \beta_i a_i P(K | G_i) / \Sigma_i \beta_i a_i$.

The overall set $\Omega$ is then defined as $\{0,1\}^{2M}$, where odd bits correspond to the foreground mixture vector $\beta^f$ and even bits correspond to the background mixture vector $\beta^b$. Vectors with all even bits and/or all odd bits equal to zero do not correspond to meaningful mixtures and are therefore assigned an infinite cost. The hierarchy tree is naturally defined by the bit-ordering (the first bit corresponding to subdivision into the first two branches etc.).

Figure 6:
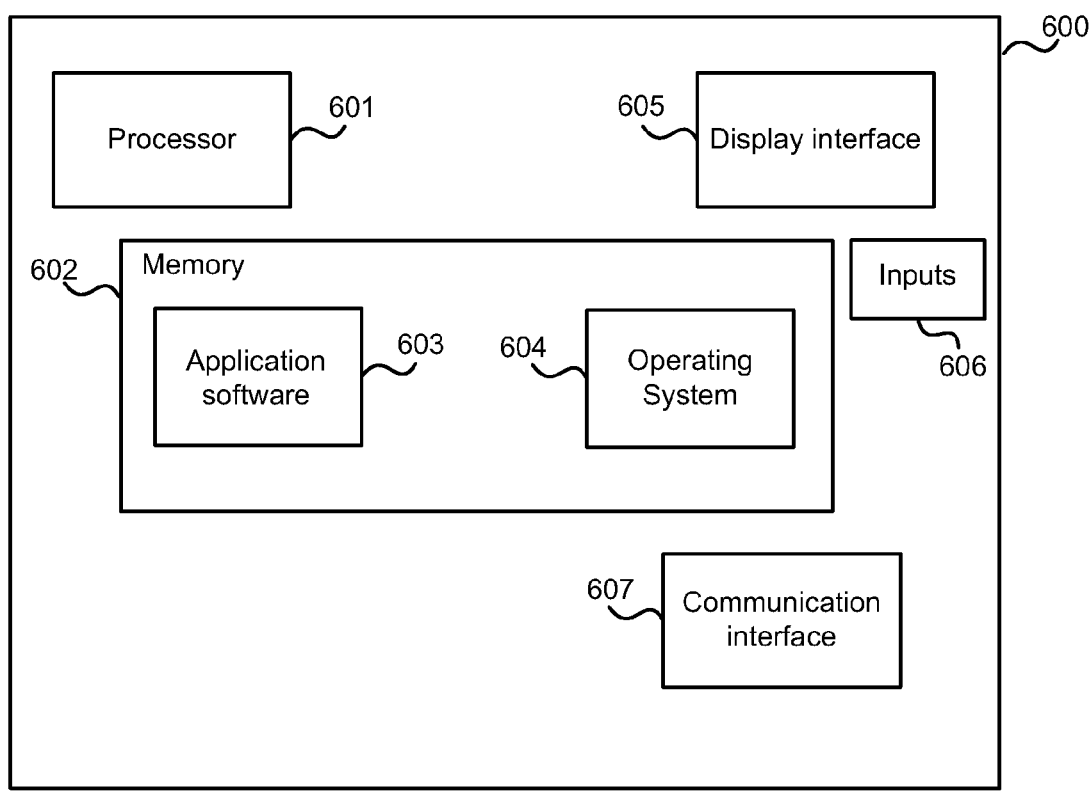
FIG. 6 illustrates an exemplary computing-based device in which embodiments of an automated image labeling system may be implemented.

FIG. 6 illustrates various components of an exemplary computing-based device 600 which may be implemented as any form of a computing and/or electronic device, and in which embodiments of an image processing system for labeling image elements may be implemented.

The computing-based device 600 comprises one or more inputs 606 which are of any suitable type for receiving digital images, parameter information, digital videos, media content, Internet Protocol (IP) input and the like. The device also comprises communication interface 607 and is able to communicate with other entities over any suitable communications network using the communication interface.

Computing-based device 600 also comprises one or more processors 601 which may be microprocessors, controllers or any other suitable type of processors for processing computing executable instructions to control the operation of the device in order to label image elements of digital images. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

A display interface 605 is optionally provided to control a display system which may be integral with or in communication with the computing-based device. The display system may provide a graphical user interface, or other user interface although this is not essential. An output is provided to provide labeled images as output as well as parameter information. The output is of any suitable type.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method, comprising the steps of:
accessing, by a processor, a digital image, the digital image comprising a plurality of image elements each to be labeled;
storing an energy function in a memory, the energy function comprising a plurality of terms, at least one of the plurality of terms being dependent on a parameter which describes a characteristic of each of the image elements having a same label;
accessing possible values of the parameter;
applying the energy function to both the digital image and the possible values of the parameter, and globally optimizing the energy function to obtain a labeled version of the digital image and an output value of the parameter;
wherein the globally optimizing the energy function comprises using a tree structure comprising a plurality of nodes, wherein each node of the tree structure is associated with the possible values of the parameter;
wherein the globally optimizing the energy function further comprises using a branch-and-bound search over the tree structure, wherein the branch-and-bound search computes a lower bound of the energy function using a min-cut process; and outputting and storing, in the memory, the labeled version of the digital image.

2. A method as claimed in claim 1 which further comprises creating and storing a data structure representing the lower bound of the energy function.

3. A method as claimed in claim 2, which further comprises using the data structure to obtain the lower bound of the energy function using the min-cut process.

4. A method as claimed in claim 1, wherein the output value of the parameter is related to the labeled version of the digital image.

5. A method as claimed in claim 1, wherein the possible values of the parameter index exemplar image segmentations.

6. A method as claimed in claim 5, wherein the exemplar image segmentations comprise segmented images of a same object in various poses and deformations.

7. A method as claimed in claim 6, wherein on the order of tens of millions of the exemplar segmentations are indexed.

8. A method as claimed in claim 1, wherein the possible values of the parameter are related to intensity values of the plurality of image elements.

9. A method as claimed in claim 1, wherein the possible values of the parameter are related to a set of color distributions.

10. An apparatus, comprising:
a memory to store a digital image, the digital image comprising a plurality of image elements each to be labeled with one of a plurality of labels;
the memory further configured to store an energy function, the energy function comprising a plurality of terms, wherein at least one of the plurality of terms is dependent on a parameter which is non-local with respect to the plurality of image elements;
an input to access possible values of the parameter;
the memory further configured to store a tree structure comprising a plurality of nodes, wherein each node of the tree structure is associated with the possible values of the parameter;
a processor to apply the energy function to both the digital image and the possible values of the parameter, the processor being further configured to globally optimize the energy function to obtain a labeled version of the digital image and an output value of the parameter;
wherein the processor is further configured to globally optimize the energy function using a branch-and-bound search over the tree structure, wherein the branch-and-bound search computes a lower bound of the energy function using a min-cut process; and
an output arranged to provide the labeled version of the digital image.

11. An apparatus as claimed in claim 10, wherein the processor is further configured to segment the digital image into a foreground region and a background region, one of the plurality of labels being used for each of the foreground and background regions.

12. An apparatus as claimed in claim 10, wherein the memory is further configured to store a data structure representing the lower bound of the energy function.

13. An apparatus as claimed in claim 12, wherein the processor is further configured to use the data structure to obtain the lower bound of the energy function using the min-cut process.

14. An apparatus as claimed in claim 10, wherein each node of the tree structure is associated with exemplar image segmentations.

15. An apparatus, comprising:
an input to receive a digital image, the digital image comprising a plurality of image elements which are to be labeled;
a memory to store a tree structure comprising a plurality of nodes, wherein each node of the tree structure is associated with candidate values of a parameter, the parameter being non-local with respect to the plurality of image elements;
the memory further configured to store an energy function, the energy function comprising a plurality of terms, wherein at least one of the plurality of terms is dependent on the parameter;
a processor to globally optimize the energy function by using a branch-and-bound search over the tree structure to obtain a labeled version of the digital image;
wherein the branch-and-bound search further comprises computing a lower bound of the energy function; and
an output to provide the labeled version of the digital image.

16. An apparatus as claimed in claim 15, wherein each node of the tree structure is associated with exemplar image segmentations.

17. An apparatus as claimed in claim 16, wherein the exemplar image segmentations comprise segmented images of a same object in different poses.

18. An apparatus as claimed in claim 15, wherein the candidate values of the parameter relate to intensity values of the plurality of image elements.

19. An apparatus as claimed in claim 15, wherein the candidate values of the parameter relate to a set of color distributions.

20. An apparatus as claimed in claim 15, wherein the memory is further configured to store a data structure representing the lower bound of the energy function, and the processor is further configured to use the data structure to obtain the lower bound of the energy function using a min-cut process.

* * * * *